United States Patent Office 3,336,342
Patented Aug. 15, 1967

3,336,342
PROCESS FOR PREPARING GLYCIDYL ETHERS OF POLYHYDRIC PHENOLS
Gunter Frank and Richard Wegler, Leverkusen, Robert Schmitz-Josten, Cologne-Stammheim, and Rolf Kubens, Leverkusen, Germany, assignors to Farbenfabriken Bayer Aktiengesellschaft, Leverkusen, Germany, a corporation of Germany
No Drawing. Filed Mar. 17, 1964, Ser. No. 352,660
Claims priority, application Germany, Mar. 21, 1963, F 39,298
3 Claims. (Cl. 260—348.6)

The object of the invention is a process for preparing low-molecular weight glycidyl ethers of polyhydric phenols.

It is known that polyhydric phenols can be converted into the corresponding glycidyl ethers by reaction with epihalohydrins in the presence of alkaline substances (Belgian specification 518,057). A drawback of this process is that undesirable by-products of higher molecular weight are formed.

Later patent specifications recommended the use of an excess of epihalohydrin, so as substantially to avoid the formation of polymeric reaction products (e.g., U.S. specification No. 2,467,171).

It has further been proposed to convert epichlorohydrin into the corresponding chlorohydrin ether in the presence of catalyst, subsequently to distil off the excess epichlorohydrin and to obtain finally from the chlorohydrins in solvent mixtures, such as alcohol/aromatic hydrocarbons, the corresponding epoxy compounds by means of alkalies or exchange resins (German Auslegeschrift 1,103,580 and 1,133,735). As catalyst, there were proposed lithium halides, tertiary amines, and quaternary ammonium compounds (French specification 1,286,345). The disadvantages of this catalytic process are the simultaneous formation of polymeric epichlorohydrins and the relatively high viscosity of the reaction products.

It has now been found that the drawbacks of such known catalytic processes for the preparation of glycidyl ethers from phenols can be avoided by using, as catalysts, sulphonium salts respectively sulphur-containing compounds which are capable of forming sulphonium/salts with the epihalohydrins.

The sulphonium salts to be used according to the invention have the general Formula I

I

in which the radicals $R_1$, $R_2$ and $R_3$, which may be identical or different, represent (a) Straight or branched alkyl groups with 1 to 12 carbon atoms, cycloalkyl or aralkyl groups, e.g., benzyl;

(b) ω-hydroxyalkyl groups, which may be interrupted by hetero atoms such as oxygen or sulphur;

(c) Cyanoethylated hydroxyalkyl groups, e.g., $-CH_2-CH_2-O-CH_2-CH_2-CN$;

(d) Epoxypropyl groups, and in which $X^\ominus$ represents a monovalent anion, preferably a halide ion.

The most important types of sulphur-containing compounds which are capable of forming sulphonium salts with epihalohydrins are (1) aliphatic or cycloaliphatic, substituted or unsubstituted thio-ethers (symmetric or asymmetric), or mixed thio-ethers;

(2) aliphatic or cycloaliphatic, substituted or unsubstituted mercaptans or corresponding mercaptides;

(3) alkali metal or ammonium sulphides or hydrosulphides.

Catalysts satisfying the present definition include: Trimethyl-sulphonium iodide, tri - (β - hydroxyethyl)-sulphonium chloride, diethyl sulphide, β-hydroxyethyl ethyl sulphide, γ-hydroxypropyl ethyl sulphite, ω-hydroxytetramethylene ethyl sulphide, triodiglycol, mono-β-cyanoethyl thiodiglycol ether, dibenzyl sulphide, benzyl ethyl sulphide, benzyl butyl sulphide, dibenzyl methyl sulphonium bromide, glycidyl ethyl sulphide, 2,3 - epoxyproplymethyl ethyl sulphonium iodide, dodecyl methyl sulphide and dithian.

It was surprising that the addition of epihalohydrin to phenolic hydroxyl groups in the presence of the above-mentioned catalysts takes place so smoothly and practically without formation of undesirable chlorine-containing polymers of the epihalogen compound which would contain difficulty hydrolyseable halogen atoms. In particular, in the preparation of glycidyl ethers of polyhydric phenols, e.g., of bisphenol A, thinly-flowing resins, i.e., resins having a viscosity of less than 30,000 cp. at 20° C. are obtained after the treatment of the chlorohydrins with alkaline agents. These cannot be obtained under the same conditions but using tertiary amines, quaternary aminonium salts and similar which give products with viscosities of at least 35,000 at 20° C. It is therefore to be concluded that the reaction products obtained according to the present process contain a very high proportion of primary reaction products of the polyhydric phenols with epihalohydrins, i.e., the low-molecular chlorohydrin-ethers of the polyhydric phenols employed.

In the following table, the polymerisability of epichlorohydrin in the presence of known catalysts is compared with the polymerisability in the presence of the catalysts according to the invention. To this effect, 5 mols. of epichlorohydrin and 10 g. of catalyst are heated for 40 hours at 80° C., the catalyst is washed out with water, the solution is dried and the residue is fractionally distilled and then analysed.

| Epichlorohydrin, g. | Catalyst and amount | Conditions of reaction | Chlorine-containing polymer (polymeric epichlorohydrin), g. |
|---|---|---|---|
| 462.5 | 10 g. N-methylpyridinium iodide | 40 hrs. 80° C | 74 |
| 462.5 | 10 g. lithium chloride | 40 hrs. 80° C | 24 |
| 462.5 | 10 g. dimethyl benzylamine | 40 hrs. 80° C | 14 |
| 462.5 | 10 g. trimethyl benzyl ammonium chloride. | 40 hrs. 80° C | 8 |
| 462.5 | 10 g. trimethyl sulphonium iodide | 40 hrs. 80° C | |
| 462.5 | 10 g. 2-hydroxyethyl sulphide | 40 hrs. 80° C | |
| 462.5 | 10 g. thiodiglycol | 40 hrs. 80° C | |
| 462.5 | 10 g. diethyl sulphide | 40 hrs. 80° C | |
| 462.5 | 10 g. tri-β-hydroxy ethyl sulphonium chloride. | 40 hrs. 80° C | |

Phenolic compounds with at least two phenolic OH-groups include, for example: mononuclear, polyhydric phenols (resorcinol or pyrogallol), dihydric phenols of diphenyl-alkanes such as 4,4'-dihydroxy-diphenyl ethane and 4,4'-dihydroxy-diphenyl methane, which can also be alkylated or halogenated, 4,4'-dihydroxy-diphenyl sulphone, reaction products of monohydric phenols with aldehydes having at least two OH-groups, phenols obtained by reacting aromatic hydroxycarboxylic acids with polyhydric alcohols or polyvalent halo-alkanes (see German patent application No. F 35,921, IVd/39c) such as 4,4'-dibutylene glycol, 4,4'-dibutylene glycol-bis-(2-hydroxybenzoate) and diethylene glycol-bis-(4-hydroxybenzoate). Liquid di- or polyhydric phenols are preferred.

The catalysts according to the invention are employed in amounts from 0.01 to 5%, preferably 0.05 to 2%, per phenolic OH-group. They can be added directly to the epihalohydrin-phenolic compound mixtures or in the form of an aqueous solution. These catalysts may also be deposited on supports, such as silicates, alumina and silica.

The addition of epihalohydrins, for example of epichlorohydrin, epibromohydrin or 1,4-dichloro-2,3-epoxybutane, to the phenolic hydroxyl group takes place in the presence of the catalysts according to the invention at temperatures from 30 to 120° C., preferably at 50 to 90° C., continuously or discontinuously. At least 1 mol. of epihalohydrin is used for each phenolic hydroxyl group present. The upper limit is determined by economic considerations, being approximately 10 mols. In the preferred embodiment 4 to 6 mols. of epihalogenhydrin are employed for every phenolic hydroxyl group.

The process for preparing a low-molecular polyglycidyl ether can be carried out, for example, by heating 1 mol. of the polyhydric phenol with 5 mols. of epichlorohydrin for each phenolic OH and 0.1% of the catalyst for 40 hours at 80° C., distilling off the excess epichlorohydrin and taking up the remaining chlorohydrin ether in an aromatic hydrocarbon.

The chlorohydrin-ether can be converted into the corresponding glycidyl ether in well-known manner by treatment with alkaline reactants, such as aqueous alkalis or organic bases, continuously or discontinuously, at temperatures from 15 to 80° C.

The polyglycidyl ethers obtained by the present process can be hardened into shaped bodies in manner known per se, by the usual curing agents employed for hardening polyepoxy compounds, e.g., amines, acid anhydrides and polybasic acids.

Owing to the low viscosity of the polyglycidyl ethers prepared according to the present process, they have a better workability and a substantially higher filling capacity.

The glycidyl ethers of polyhydric phenols obtained by the present process can be employed alone or extended as low-viscosity cast resins, using the conventional curing agents, for electrical insulation or in the manufacture of tools, rulers, models, for coating pipes or floors or as adhesives, putties, sealing compounds or casting masses.

*Example 1*

1 mol. (228 g.) of 4,4'-dihydroxydiphenyl dimethylmethane, 10 mols. 925 g.) of epichlorohydrin and 2 g. of β-hydroxyethyl ethyl sulphide are heated for 40 hours at 50° C. After distilling off the excess epichlorohydrin, the reaction product is taken up in 400 g. of benzene, then mixed with 320 g. of 50% by weight NaOH at 25 to 30° C. and stirred for a further 20 hours at 25 to 30° C. 600 cc. of water are added to the product and the whole is thoroughly stirred, the aqueous phase is allowed to settle, the phases are separated and the benzene phase is washed until neutral with an aqueous sodium chloride solution at 50° C. After distilling off the benzene, lastly in vacuum of 15 mm. Hg and at internal temperatures up to 140° C., there is obtained a light yellow resin with an epoxy-equivalent of 192, 0.52% chlorine and a viscosity of 24,000 cp. at 20° C. Yield: 93% of the theoretical.

*Example 2*

1 mol. (402 g.) of dibutylene-glycol-bis-(p-hydroxybenzoate), 10 mols. (925 g.) of epichlorohydrin and 2 g. of diethyl sulphide are heated for 40 hours at 50° C. The excess epichlorohydrin is then distilled off and the residue is taken up in 700 g. of benzene. 320 g. of 50% by weight NaOH are added at 25 to 30° C., the whole is stirred for 20 hours and then mixed with 600 cc. of water. After separation of the phases, the aqueous phase is run off, the benzene phase is washed repeatedly until neutral with saturated sodium chloride solution at 50° C., separated and the benzene is distilled off, lastly at 15 mm. Hg and 140° C. bath temperature. The dibutylene glycol-bis-(p-epoxypropoxy-benzoate) had the following properties: Epoxy-equivalent: 316; chlorine: 1.07%; $\eta_{20}$=9000 cp. Yield: 96.3% of the theoretical.

*Example 3*

1 mol. (228 g.) of 4,4'-dihydroxydiphenyl-dimethylmethane, 6 mols. (555 g.) of epichlorohydrin and 2 g. of trimethyl sulphonium iodide are heated for 40 hours at 50° C. The excess epichlorohydrin is then distilled off and the resulting bis-chlorohydrin is taken up in 400 g. of benzene. 320 g. of 50% by weight NaOH are added at 25 to 30° C. and the whole is then stirred for a further 18 hours. After adding 600 cc. of water, the aqueous layer is separated, the benzene layer is washed to neutrality with sodium chloride solution and the benzene is distilled off. The residue is the diglycidyl-ether of 4,4'-dihydroxydiphenyl dimethyl methane, with an epoxy-equivalent of 195, $\eta_{20}$=26,000 cp. Cl: 0.6%. Yield: 95% of the theoretical.

*Example 4*

1 mol. (402 g.) of dibutylene-glycol-bis-(p- hydroxybenzoate), 8 mols. (740 g.) of epichlorohydrin and 2 g. of dodecyl ethyl sulphide are heated for 40 hours at 50° C. The excess epichlorohydrin is distilled off and the resulting bis-chlorohydrin is taken up in 700 g. of toluene. 320 g. of 50% by weight NaOH are added at 20 to 30° C., the whole is stirred for 20 hours and mixed with 600 cc. of water. After processing in the usual manner, dibutyleneglycol-bis-(p-epoxypropoxybenzoate) is obtained in a yield of 95%. Epoxy-equivalent: 321; chlorine: 0.98%; $\eta_{20}$=9400 cp.

*Example 5*

110 parts by weight of pyrocatechol and 925 parts by weight of epichlorohydrin are heated to 50° C. After the addition of 4 parts by weight of 2-hydroxyethyl-ethylsulfide the reaction starts with a slight increase in temperature. After a reaction time of 12 hours at 50° C., the reaction product freed from epichlorohydrin has a chlorine content of 182 percent. The mixture is then heated to 60° C. for another 12 hours. 48 parts by weight of solid sodium hydroxide are then added in portions within 1 hour at 60° C., whereupon the temperature rises up to about 85° C. The mixture is then refluxed for another hour while the water formed is removed. After separating off the sodium chloride, the mixture is distilled in vacuum up to a sump temperature of 110° C. at 0.2 mm. Hg. The yield amounts to 210–220 parts by weight of pyrocatechol-diglycidyl ether with an epoxy equivalent of 140. The viscosity is $\eta_{20}$=324 cp.

*Example 6*

1000 parts by weight of 4,4'-dihydroxy-diphenylsulfone, 3700 parts by weight of epichlorohydrin and 16 parts by weight of 2-hydroxyethyl ethylsulfide are heated to 57° C. for 40 hours, whereupon the sulfone dissolves. A sample freed from excess epichlorohydrin has then a chlorine content of 15 percent. 320 parts by weight of solid sodium hydroxide are then added within 1 hour at 60° C. and the whole is refluxed for another hour, the water formed in the reaction being simultaneously removed. The hot solution is filtered off from the sodium chloride. Upon cooling the filtrate the reaction product crystallizes. Including the portion recovered from the mother liquor the yield is 1150 parts by weight of 4,4'-dihydroxy-diphenyl-sulfone diglycidyl ether of the melting point 156–158° C., an epoxy equivalent of 193 and a chlorine content of 0.6 percent. Besides, there are obtained about 200 parts by weight of a fraction with 3 percent chlorine and an epoxy equivalent of 225; this fraction yields the same product by treatment with a NaOH-solution.

*Example 7*

1 mol=228 g. of 4,4'-dihydroxy diphenyl dimethyl methane, 6 mols=555 g. of epichlorohydrine and 4 g. of trimethyl-sulfonium iodide are heated to 110–115° C. for 15 hours. The excess epichlorohydrin is subsequently distilled off and the bis-chlorohydrin is taken up in 400 g. of benzene. At 25–30° C. 320 g. of a 50 percent NaOH-solution are run in and the whole is stirred at 25–30° C. for another 18 hours. After the addition of 600 cm.$^3$ of water, the aqueous layer is separated, the benzene layer is washed with common salt solution until neutral and the benzene is distilled off. As residue there is obtained the diglycidyl ether of 4,4'-dihydroxy diphenyl dimethyl methane of the following values:

Epoxy equivalent=202
$\eta_{20}$=25700 cp.
Cl=0.7 percent

Yield: about 92 percent of the theoretical amount.

*Example 8*

1 mol=228 g. of 4,4'-dihydroxy diphenyl dimethyl methane, 6 mols=555 g. of epichlorohydrin and 4 g. of tri-($\beta$-hydroxy-ethyl)-sulfonium chloride are heated to 60° C. for 40 hours. The excess epichlorohydrin is then distilled off and the reaction product is taken up in 400 g. of benzene. 160 g. of a 50 percent NaOH-solution is then added dropwise within 1 hour at an inside temperature of 80° C. in such a manner that the water which is present is discharged by azeotropic distillation with benzene. After cooling to room temperature 400 cm.$^3$ of water are added, the aqueous layer is separated and working up is carried out as described in the preceding examples. The resultant diglycidyl ether of 4,4'-dihydroxy-diphenyl dimethyl methane is found to have the following values:

epoxy equivalent=200
$\eta_{20}$=27300 cp.
Cl=0.4 percent

Yield: about 90 percent of the theoretical amount.

*Example 9*

1 mol=228 g. of 4,4'-dihydroxy diphenyl dimethyl methane, 10 mols=925 g. of epichlorohydrin, 5 g. of 2-hydroxyethyl benzyl-sulfide are heated to 110–115° C. for 15 hours and worked up as described in Example 7. The resulting diglycidyl ether of 4,4'-dihydroxy diphenyl dimethyl methane has an epoxy equivalent of 198, Cl=0.65 percent, $\eta_{20}$=24700 cp.

*Example 10*

1 mol=228 g. of 4,4'-dihydroxy diphenyl dimethyl methane, 10 mols=925 g. of epichlorohydrin and 6 g. of Na$_2$S.9H$_2$O are heated to 110–115° C. for 20 hours. The excess epichlorohydrin is then distilled off and the bis-chlorohydrin of 4,4'-dihydroxy diphenyl dimethyl methane is worked up as described in Example 7. The diglycidyl ether of 4,4'-dihydroxy diphenyl dimethyl methane is obtained in a yield of 89 percent having the following values:

epoxy equivalent=204
$\eta_{20}$=28300 cp.
Cl=0.6 percent

Because of the reaction of the epichlorohydrin with Na$_2$S the process is practically carried out with the sulfonium salt

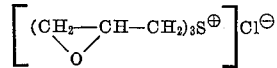

What we claim is:

1. A process for preparing a glycidyl ether of a polyhydric phenol which comprises steps of reacting, at temperatures from 30 to 120° C., a mixture containing a polyhydric phenol, an epihalohydrin and a sulphonium salt of the formula:

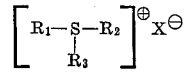

wherein R$_1$, R$_2$ and R$_3$ are selected from the group consisting of alkyl having from 1 to 12 carbon atoms, $\omega$-hydroxyalkyl having from 1 to 4 carbon atoms, epoxypropyl and benzyl and X$^\ominus$ is a halide anion, said mixture containing from 1 to 10 mols of epihalohydrin for each phenolic hydroxyl group of said polyhydric phenol and from 0.01 to 5% by weight of said sulphonium salt calculated on the phenolic hydroxyl groups of said polyhydric phenol, removing excess epihalohydrin reactant and treating recovered epihalohydrin ether of said polyhydric phenol with an alkaline reactant to obtain said glycidyl ether of said polyhydric phenol.

2. The process of claim 1 wherein said sulphonium salt is formed in said mixture by simultaneously adding to said mixture an epihalohydrin and a member selected from the group consisting of an aliphatic thioether, an alkali metal sulphide and an ammonium sulphide.

3. The process of claim 1 wherein said reaction is carried out at temperatures from 50 to 90° C.

References Cited

UNITED STATES PATENTS

| | | | |
|---|---|---|---|
| 2,111,260 | 3/1938 | Brunner et al. | 260—607 |
| 2,252,081 | 8/1941 | Lieber | 260—607 |
| 2,309,691 | 2/1943 | Brannon | 260—607 |
| 2,772,296 | 11/1956 | Mueller | 260—348 |
| 2,864,805 | 12/1958 | Cooke | 260—348.6 X |
| 3,053,855 | 9/1962 | Maerken et al. | 260—348.6 X |
| 3,176,027 | 3/1965 | Budnowski et al. | 260—348.6 |

FOREIGN PATENTS 888,945   2/1962   Great Britain.

WALTER A. MODANCE, *Primary Examiner*,

N. S. MILESTONE, *Examiner.*